United States Patent [19]

Tabayashi

[11] Patent Number: 4,856,959
[45] Date of Patent: Aug. 15, 1989

[54] CARRIER FOR CYLINDRICAL CONTAINERS

[75] Inventor: Toshikazu Tabayashi, Suita, Japan
[73] Assignee: Osaka Taiyu Co., Ltd., Osaka, Japan
[21] Appl. No.: 122,805
[22] Filed: Nov. 17, 1987
[30] Foreign Application Priority Data Nov. 19, 1986 [JP] Japan .................. 61-177771[U]
Nov. 27, 1986 [JP] Japan .................. 61-183176[U]

[51] Int. Cl.⁴ .................. B62B 3/04; B66F 9/18
[52] U.S. Cl. .................. 414/451; 188/30; 188/82.1; 414/456
[58] Field of Search .......... 414/490, 434, 438, 444, 414/450–456; 188/30, 61, 82.1, 82.3, 82.84

[56] References Cited

U.S. PATENT DOCUMENTS

| | | | |
|---|---|---|---|
| 759,459 | 5/1904 | Minter | 414/451 |
| 795,363 | 7/1905 | O'Connor | 188/82.1 |
| 943,265 | 12/1909 | Parker | 414/450 |
| 1,827,209 | 10/1931 | Robbins | 414/444 X |
| 2,073,726 | 3/1937 | Bates | 188/82.84 X |
| 2,527,118 | 10/1950 | Cunningham | 188/30 X |
| 2,663,440 | 12/1953 | Jackson | 414/456 X |
| 3,542,415 | 11/1970 | Ratcliff | 188/82.84 X |
| 3,750,593 | 8/1973 | Zetterlund | 188/82.84 X |
| 3,941,399 | 3/1976 | Peters et al. | 414/456 X |
| 4,699,686 | 6/1987 | Huber et al. | 188/82.84 X |

FOREIGN PATENT DOCUMENTS

3312463C2  2/1984  Fed. Rep. of Germany .
3516246.9  9/1985  Fed. Rep. of Germany .
55-10422   3/1980  Japan .

OTHER PUBLICATIONS

Fördermittel-Journal, p. 91, Date of Publication Sep. 1972.
Fördern and Heben 19 (1969) Nr. 4, p. 200, Date of Publication 1969.
Fördern and Heben 23 (1973) Nr. 1, pp. 31–32, Date of Publication 1973.

Primary Examiner—David A. Bucci
Attorney, Agent, or Firm—Armstrong, Nikaido, Marmelstein, Kubovcik & Murray

[57] ABSTRACT

A carrier for a cylindrical container possesses function of raising the container from a fallen position to an upright position. The carrier comprises a movable dolly, a lift drive assembly mounted on the dolly, a lift frame provided on the dolly, a clamp assembly provided on the lift frame, a pair of arms extending from the lift frame and spaced apart by a distance smaller than the lateral width of the cylindrical container to be lifted, the arms being movable between a horizontal position and an upright position each in a vertical plane along the direction of advance of the carrier, and one-way brake means for preventing the dolly from retraction but permitting the advance of the dolly when the container is raised to an upright position and lifted or lowered.

8 Claims, 5 Drawing Sheets

CARRIER FOR CYLINDRICAL CONTAINERS

FIELD OF THE INVENTION

The present invention relates to a carrier having the function of raising a fallen cylindrical container such as a drum.

BACKGROUND OF THE INVENTION

Conventional carriers for use in transporting drums comprise a lift frame mounted on a dolly and a clamp assembly provided on the lift frame for holding the drum (see for example Examined Japanese Patent Publication SHO 55-10422).

Such conventional carriers are solely so adapted as to clamp the drum in an upright position and transport the drum to the desired location by being pushed manually after lifting the drum off the floor, but are unable to carry a fallen drum as it is. Accordingly, the worker must raise up the drum by hand before transport using a lever or the like specifically designed therefor. This procedure is cumbersome, requires hard labor and involves the likelihood that the hand will slip and become injured.

SUMMARY OF THE INVENTION

The present invention proposes a carrier having the function of raising up a drum or like cylindrical container from a fallen position utilizing the lifting force of a lift frame to relieve the worker of the hard labor of raising up the container manually.

The object of the invention is to provide a container carrier which comprises a lift frame provided on a dolly, a pair of arms extending from the lift frame and spaced apart by a distance smaller than the lateral width of the cylindrical container to be lifted, the arms being movable between a horizontal position and an upright position each in a vertical plane along the direction of advance of the carrier, and one-way brake means for preventing the dolly from retraction but permitting the advance of the dolly when the container is raised to an upright position and lifted or lowered.

DESCRIPTION OF THE PREFERRED EMBODIMENTS

Figure 1:
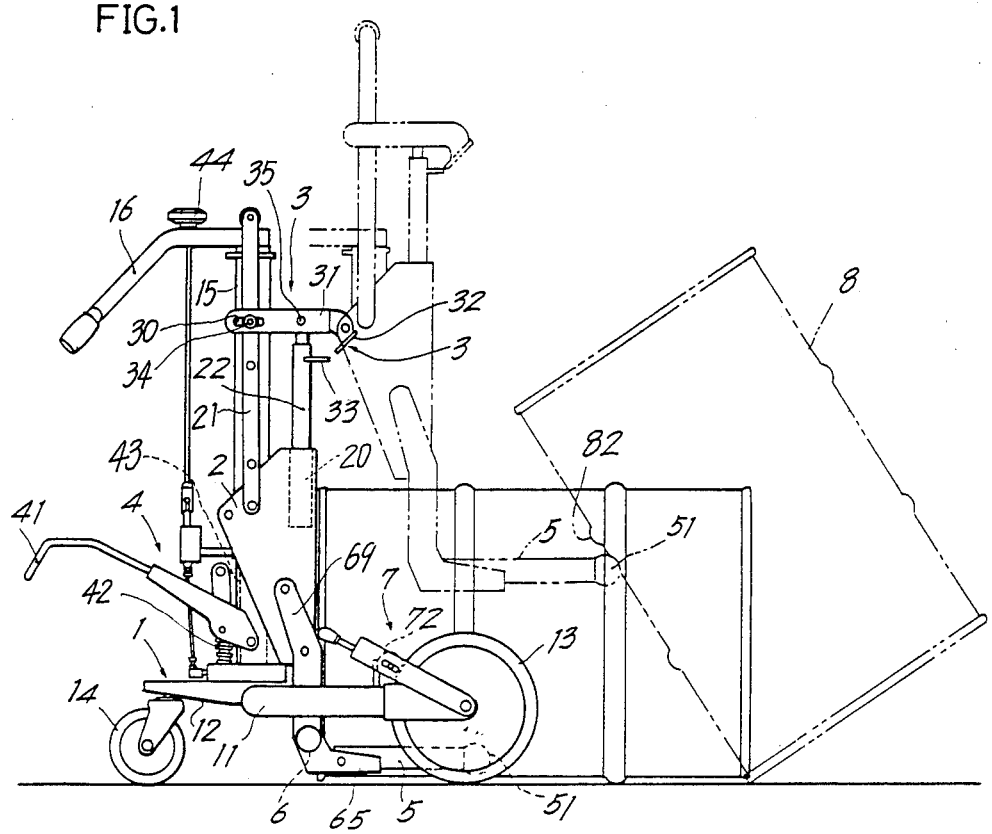
FIG. 1 is a front view showing a carrier with arms in a fallen position.

The present invention will be described in detail with reference to the embodiments shown in the drawings. It is to be understood that these embodiments are given for illustrative purposes only and in no way limit the invention.

Figure 2:
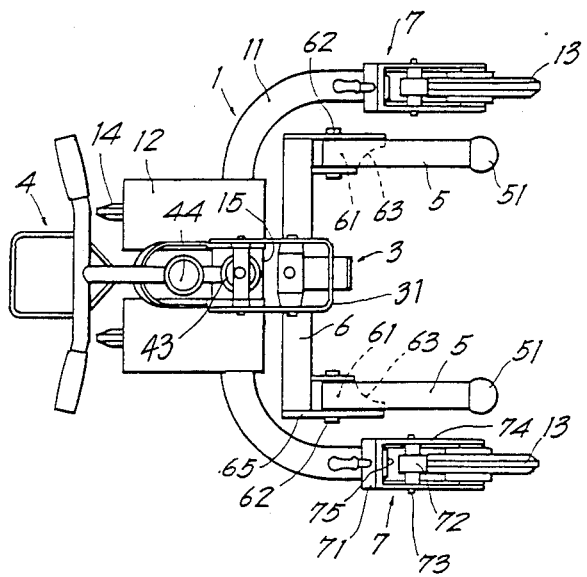
FIG. 2 is a plan view of the carrier of FIG. 1.
Figure 4:
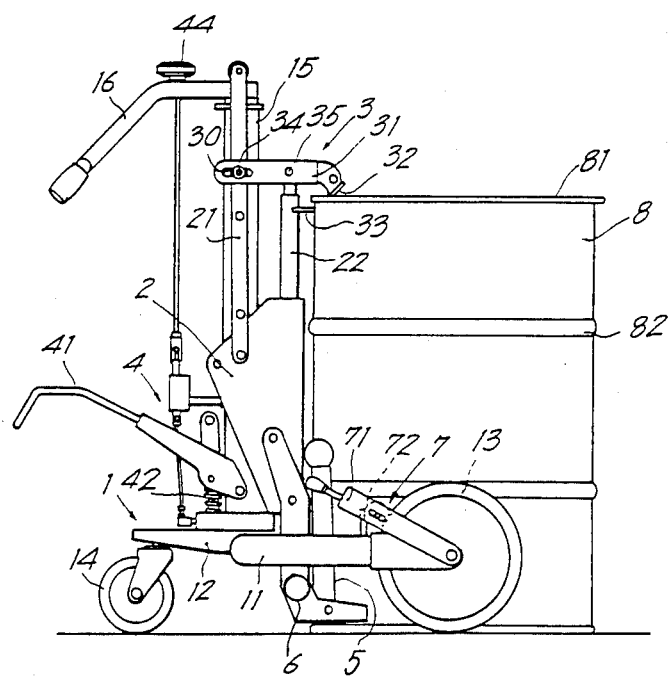
FIG. 4 is a front view showing the carrier with the arms in an upright position.

FIG. 1 shows a carrier which is designed specifically for transporting a drum 8. With reference to FIGS. 1, 2 and 4, the carrier comprises a dolly 1 which includes a U-shaped frame 11, a projecting base plate 12 provided at the center of the frame, rear wheels 14 attached to the base plate and each in the form of a caster, and front wheels 13 attached to the respective ends of the U-shaped frame 11.

A vertical hollow guide bar 15 is mounted on the base plate 12 and has a push handle 16 projecting from its upper end. A lift frame 2 is vertically movable along the guide bar 15.

A lift drive assembly 4 is coupled to the lift frame 2. The lift drive assembly 4 of the present embodiment comprises a hydraulic cylinder 43 disposed within the guide bar 15 and having a piston rod directed upward, two suspension plates 21, 21 suspended from the upper end of the piston rod along opposite sides of the guide bar 15 and connected at their lower ends to the lift frame 2, and a hydraulic pressure generator 42 of the treadling type mounted on the base plate 12 and connected to the cylinder 43. A pressure relief rotatable knob 44 is coupled to the pressure generator 42.

A clamp assembly 3 for the drum 8 is mounted on the lift frame 2. The clamp assembly 3, which is already known, has a support rod 22 slidably fitted in a support pipe 20 attached to the lift frame 2. The rod 22 projects upward from the front of the lift frame 2. A lower pawl plate 33 projecting forward from the upper end of the support rod 22 serves to support the upper edge 81 of the drum from below.

A holding member 31 is movably supported by a pivot 35 on the upper end of the support pipe 22. A pin 34 projecting from each suspension plate 21 is engaged in a horizontal slot 30 formed in the member 31 at its one end close to the guide rod 15.

The holding member 31 has a movable upper pawl plate 32 projecting from the other end thereof and opposed to the lower pawl plate 33.

When the lower pawl plate 33 is loaded by the upper edge 81 of the drum 8 bearing thereon, the holding member 31 is subjected to a torque acting downward about the pivot 35 and causing the upper pawl plate 32 and the lower pawl plate 33 to clamp the upper edge 81 of the drum 8.

The front side of the holding member 31 is upwardly rotatable by an amount permitted by the slot 30 to render the drum upper edge 81 disengageable from the upper pawl plate 32.

Inwardly of the curved U-shaped frame 11, the lift frame 2 has a connecting plate 69 attached to each of its opposite sides and vertically movable with the lift frame 2. The lower ends of the connecting plates 69 are joined to a horizontal bar 6 which is perpendicular to the direction of advance of the dolly 1 which is provided with a pair of arms 5, 5 each movable between a horizontal position and an upright position in a vertical plane along the direction of advance of the dolly 1.

A bracket 65 extends from each end of the horizontal bar 6 toward the direction of advance of the dolly 1. The arm 5 is supported at its base end by a pivot 62 movably about the pivot.

Figure 3:
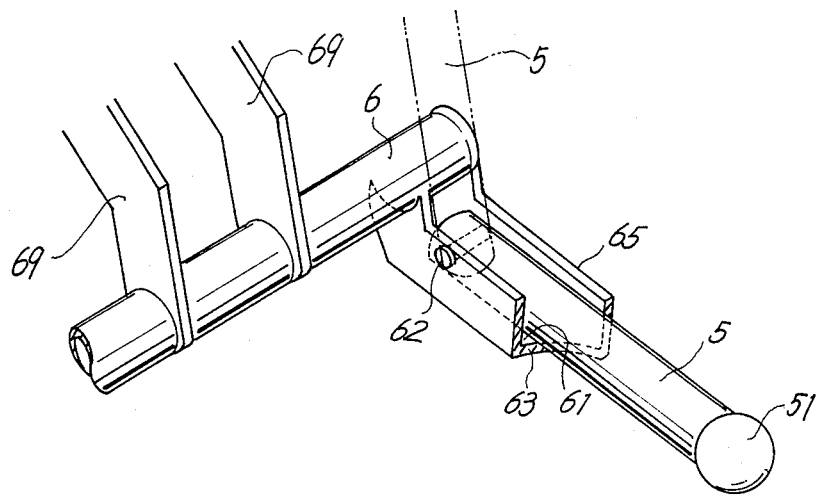
FIG. 3 is a perspective view of an arm support assembly.

The arm 5, when raised, is retainable in an upright position slightly inclined rearward from the vertical by contact with the horizontal bar 6 as indicated in broken line in FIG. 3.

The bracket 65 is formed at its forward end with a stop plate 61 for holding the arm 5 in the horizontal position. The forward end of the stop plate 61 has a circular-arc face 63 in conformity with the periphery of the drum 8. When the drum 8 is to be lifted as will be described later, the circular-arc face 63 comes into contact with the peripheral wall of the drum 8, serving the function of holding the drum 8 in a substantially vertical position.

The distance between the arms 5, 5 is slightly smaller than the diameter of the drum 8. The arm 5 has a length larger than the length of the drum 8 from one end thereof to the first bulging rim 82 thereof from the end. Each arm 5 has at its forward end an approximately spherical contact member 51 engageable with the rim 82. The contact member 51 is made of a material, such as rubber, having a great coefficient of friction.

According to the preferred embodiment of the invention, brake means 7, which is free to actuate or release, is provided at each end of the U-shaped frame 11 for preventing the carrier from retraction but permitting the advance of the carrier.

Figure 5:
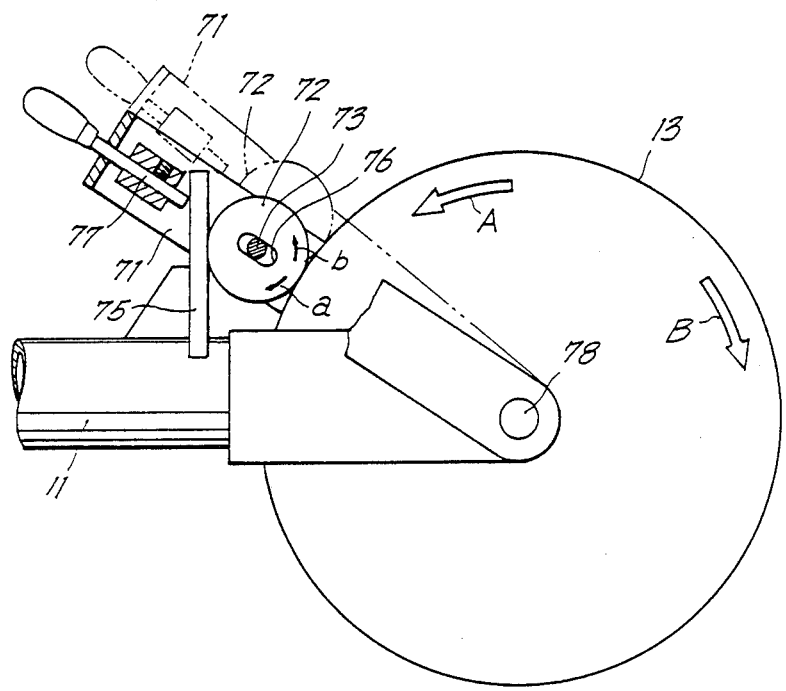
FIG. 5 is a front view of brake means.

With reference to FIG. 5, the brake means 7 comprises a plate 75 extending upward from each end of the frame 11 and positioned in the rear of the wheel 13, and a brake roller 72 engageable in a space between the wheel 13 and the plate 75.

The brake roller 72 has an outer peripheral portion made of an elastic material and has a diameter larger than the minimum distance between the plate 75 and the wheel 13.

The roller 72 is rotatably supported by a pivotally movable bifurcated lever 71 attached to opposite ends of an axle 78 for the wheel 13. The roller 72 is supported on a shaft 73 which is fitted in slots 76 formed in the lever 71 and is movable over the length of the slots 76.

The free end of the lever 71 is provided with an actuating bar 77 having a handle and slidable longitudinally of the lever 71. When the lower side of the actuating bar 77 is in engagement with the upper end of the plate 75, the brake roller 72 is away from the plate 75 as indicated in phantom lines. When the bar 77 is then pulled and made to clear the plate 75, allowing the lever 71 to fall as seen in solid lines, the roller 72 comes into contact with both the plate 75 and the wheel 13.

If a retracting force acts on the carrier in the above state, i.e., if the wheel 13 is rotated in the direction of arrow A in FIG. 5, the roller 72 is rotated in a direction a opposite to the direction A by the wheel 13 in frictional contact therewith. At this time, the roller 72 is subjected to a downward force and is thereby engaged in the space between the plate 75 and the wheel 13, preventing the wheel 13 from rolling rearward.

When the carrier advances, i.e. when the wheel rotates in the direction of arrow B, the roller 72 rotates in the direction of arrow b. Owing to an upward force then acting on the roller 72, the roller 72 will not advance into the space between the plate 75 and the wheel 13, permitting the wheel 13 to roll along forward free of trouble.

The carrier is used in the following manner.

Raising Drum up

To raise a fallen drum 8 to an upright position, the arms 5 are moved forwardly downward to a horizontal position, the lift frame 2 is lowered, and the carrier as opposed to the top side of the drum is pushed forward until the contact members 51 at the ends of the arms 5 advance beyond the rim 82 of the drum 8. Next, the hydraulic pressure generator 41 is treadled to raise the lift frame 2.

With the rise of the lift frame 2, the arms 5 also rise therewith, bringing the contact members 51 on the arms 5 into contact with rim 82 of the drum 8. The arms 5 further rise, raising the top side of the drum 8.

The contact members 51 at the ends of the arms 5 are made of a material having a great coefficient of friction and are in engagement with the rim 82 of the drum, so that as the drum 8 is raised, a force acts on the carrier to draw the carrier toward the drum 8. Being free to advance, the carrier moves forward following the movement of the drum.

Should the contact members 51 on the arms 5 slip off the rim 82 of the drum 8 or if the lift frame 2 stops during lifting with the drum 8 in an oblique position, the gravity on the drum 8 will act to push the carrier rearward, whereas the brake means 7 of the present embodiment act to prevent the front wheels 13 from rolling rearward as already stated. Consequently, the carrier will not retract, hence safety.

When the center of gravity of the drum moves beyond a vertical plane through the point of contact of the drum with the floor, the drum sets itself upright.

Thus, the force of the lift drive assembly 4 raises the lift frame 2, whereby a fallen cylindrical container such as drum can be set upright free of the hazard to be involved in the conventional method of raising the container manually.

Transport of Drum

The lift frame 2 is lowered again, and the arms 5 are disengaged from the drum and turned upward to a retracted position. The clamp assembly 3 is then caused to clamp the upright drum.

The lift frame 2 is then moved upward again to lift the drum off the floor. At this time, the drum is lifted substantially in a vertical position, with its peripheral wall in bearing contact with the circular-arc end faces 63 of the brackets 65 to which the base ends of the arms 5 are pivoted.

The drum can be transported to the desired location by moving the carrier in this state.

Retraction of Carrier

When there arises a need to retract the carrier, the carrier can be made so movable by holding each plate 71 in the pulled-up position indicated in broken lines in FIG. 5 so as not to engage the brake roller 72 in the space between the plate 75 and the wheel 13.

Another Embodiment of Brake Means

Another brake means 7 embodying the invention will be described.

Figure 6:
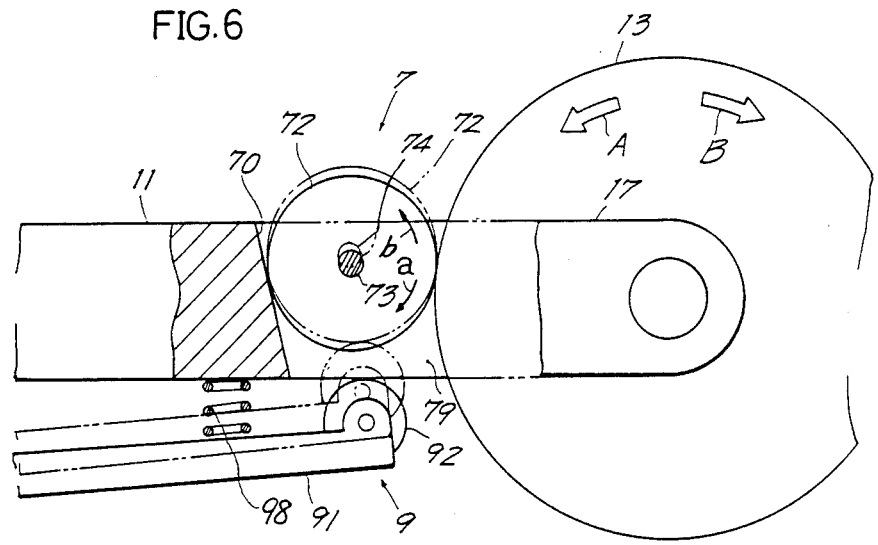
FIG. 6 is a front view of another brake means embodying the invention.

With reference to FIG. 6, the bifurcated portion 17 at each end of the frame 11 for supporting the wheel 13 is formed at its base end with a bearing face 70 inclined downwardly forward toward the wheel 13 to provide between the bearing face 70 and the wheel 13 a space 79 which is enlarged upward. The space 79 has fitted therein a brake rolling member 72 in the form of a roller or a sphere and having a diameter larger than the minimum clearance (i.e. minimum dimension as measured longitudinally of the frame end) of the space 79.

The rolling member 72 has an outer peripheral portion made of an abrasion-resistant elastic material and a shaft 73 extending therethrough at the center. The shaft 73 is loosely fitted in vertically elongated holes 74 formed in the bifurcated portion 17.

The brake means operates in the same manner as already described when the carrier is subjected to a retracting force and also when it advances, so that the operation will not be described again.

Brake release means 9 is connected to the one-way brake means 7.

Figure 7:
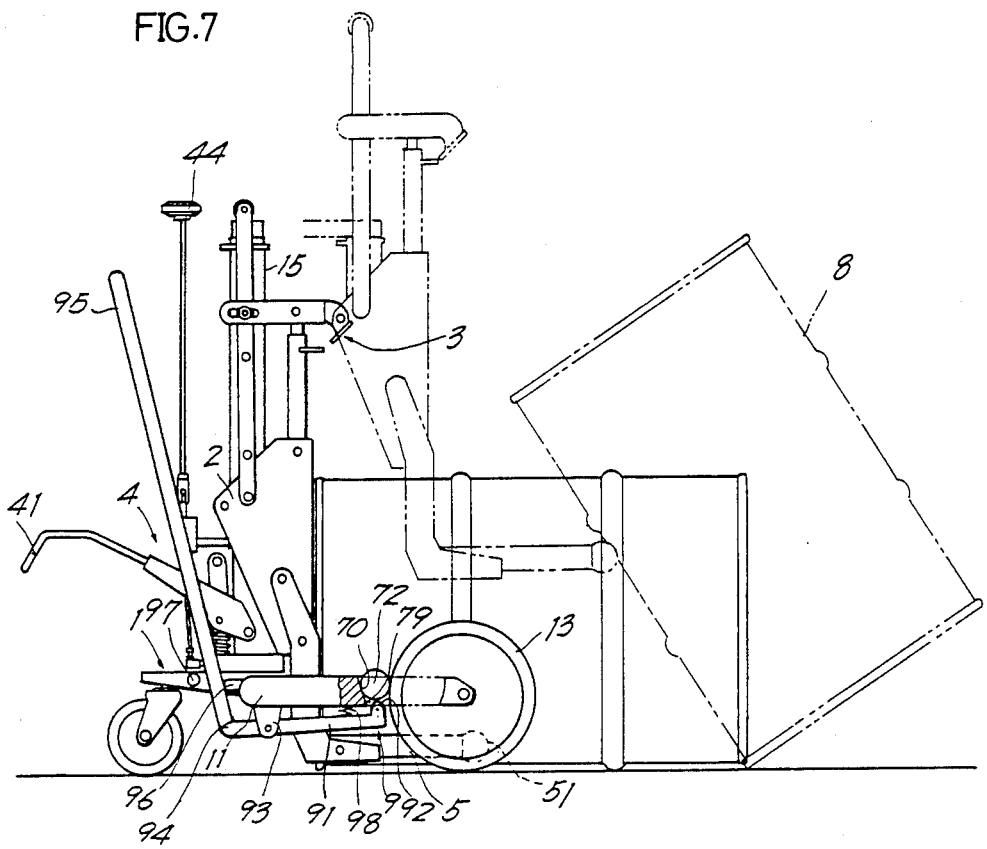
FIG. 7 is a front view of the carrier equipped with the brake means of FIG. 6, the brake means being shown as actuated.

With reference to FIGS. 6 and 7, a bracket 93 projects downward from each bent portion of the U-shaped frame 11 of the dolly 1. A rod 91 extending toward the front wheel 13 is supported by the bracket 93 so as to be pivotally movable in a horizontal plane.

The free end of the rod 91 is positioned immediately below the rolling member 72 and rotatably supports a roller 92 for pushing up the rolling member 72.

Figure 8:
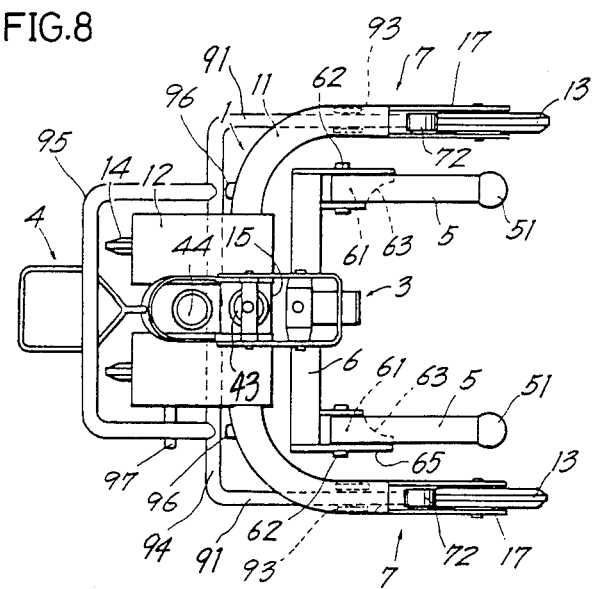
FIG. 8 is a plan view of the carrier equipped with the brake means of FIG. 6.
Figure 9:
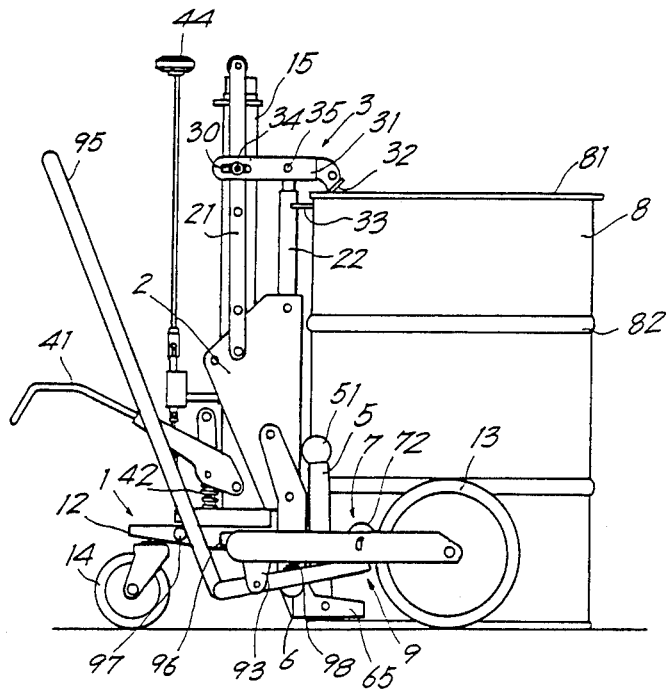
FIG. 9 is a front view of the carrier with the brake means of FIG. 6 in a released state.

As seen in FIG. 8, the two rods 91, 91 are interconnected at their base ends by a connecting rod 94. A U-shaped push handle 95 obliquely extends rearwardly upward from the connecting rod 94. The rods 91, 91 are pivotally movable with the handle 95.

As shown in FIG. 6, a spring 98 for biasing the free end of each rod 91 downward is provided between the rod 91 and the frame 11. The handle 95 is at rest in bearing contact with front stoppers 96 formed on the frame 11, with each pushing-up roller 92 in a lowered position away from the brake rolling member 72 to actuate the brake means 7. Thus, while the handle 95 is left untouched or pushed forward, the one-way brake means are always in operation, preventing the carrier from retraction.

When the push handle 95 is pulled rearward into contact with a rear stopper 97 projecting from the base plate 12, the free end of each rod 91 is raised, causing the roller 92 to push up the brake rolling member 72 out of contact with the wheel 13 and the bearing face 70 to release the break means as indicated in broken lines in FIG. 6.

The present invention is not limited to the foregoing embodiments but can be modified variously within the scope of the appended claims.

For example, when the cylindrical container to be handled has no rim unlike the drum, the object of the invention can be achieved similarly by suitably shaping the contact member 51 in conformity with the configuration of the container.

What is claimed is:

1. A barrel carrier for lifting and carrying a cylindrical container comprising:
   a movable dolly having at least one rear wheel at a rearward side thereof, at least a pair of front wheels at a forward side thereof and a substantially upright guide bar positioned between the rear and front wheels;
   a lift frame means for holding and lifting the cylindrical container and being supported by the substantially upright guide bar, the lift frame means being provided with a pair of arms each extending between the pair of front wheels with a space therebetween smaller than a diameter of the cylindrical container;
   a clamp means provided at the top of the lift frame means for releasably clamping a top corner of the cylindrical container;
   a lift drive means for vertically moving the lift frame means; and
   at least one brake means provided at at least one of the pair of front wheels for releasably braking the front wheel, the brake means having a bearing face provided upon the movable dolly adjacent to the front wheel, a movable brake roller provided between the bearing face and the front wheel, and release means for releasing the movable brake roller out of the contact with the bearing face and the front wheel such that rotational movement of the front wherein is prevented by contact of the brake roller with the bearing face and the front wheel and is released by moving the brake roller out of contact by action of the release means.

2. A carrier as defined in claim 1, wherein each of the pair of arms is provided at a forward end thereof with a contact member made of a material having a large coefficient of friction.

3. A carrier as defined in claim 1, wherein the brake means comprises a plate having the bearing face and upwardly projecting from a frame of the dolly and positioned in the rear of the front wheel, a lever of the release means supported on the frame and pivotally movable within a vertical plane and the brake roller loosely supported by the lever and having an outer peripheral portion of elastic material and movable into and out of a space between the wheel and the plate, the brake roller being movable with respect to the lever.

4. A carrier as defined in claim 1 wherein the brake means has the bearing face formed on a frame of the dolly and positioned in the rear of the front wheel to provide an upwardly enlarged spaced between the wheel and the bearing face, and the brake roller rotatably provided in the space upwardly and downwardly movably and having a diameter larger that the minimum clearance of the space, the release means being disposed opposed to the brake roller the release means comprising a rod supported by the frame o the dolly and pivotally movable in a vertical plane, the rod having a free end positioned under the brake roller and a base end having a carrier push handle connected thereto.

5. A carrier as defined in claim 3 wherein the brake roller is in the form of a sphere.

6. A carrier as defined in claim 3 wherein the brake roller is supported on a shaft loosely fitted in holes formed in the frame.

7. A carrier as defined in claim 2, wherein the lever is supported on the frame pivotally movably in a vertical plane and has a shaft movably mounted thereon, and the brake roller is supported on the shaft.

8. A carrier as defined in claim 2, wherein the release means comprises a holder coupled to the lever for releasably holding the lever at a position where the brake roller is away from the bearing face.

* * * * *

UNITED STATES PATENT AND TRADEMARK OFFICE
CERTIFICATE OF CORRECTION

PATENT NO. : 4,856,959

DATED : August 15, 1989

INVENTOR(S) : Yoshikazu TABAYASHI

It is certified that error appears in the above-identified patent and that said Letters Patent is hereby corrected as shown below:

On the cover page, Item [75], "Toshikazu" should read --Yoshikazu--.

Signed and Sealed this

Twenty-sixth Day of June, 1990

*Attest:*

HARRY F. MANBECK, JR.

*Attesting Officer*     *Commissioner of Patents and Trademarks*